Nov. 13, 1956     L. W. SCHMIDT     2,770,273
BEET IMPELLING DEVICE
Filed April 29, 1955     2 Sheets-Sheet 1
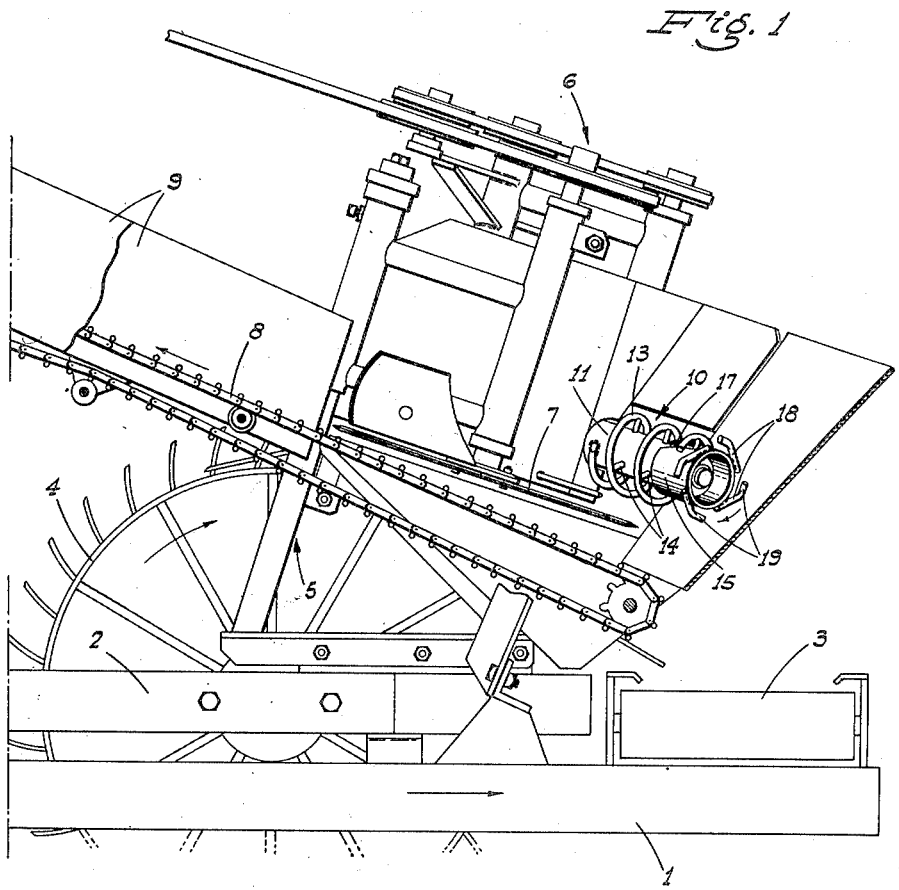
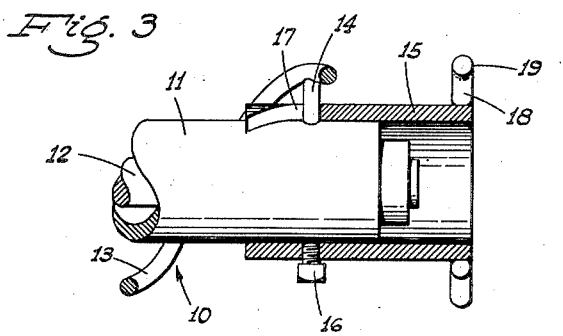
INVENTOR
Lewis Wallace Schmidt
BY Webster & Webster
ATTYS.

United States Patent Office 2,770,273
Patented Nov. 13, 1956

2,770,273
BEET IMPELLING DEVICE
Lewis Wallace Schmidt, Rio Vista, Calif.
Application April 29, 1955, Serial No. 504,776
10 Claims. (Cl. 146—85)

This invention relates in general to a beet harvester of the type illustrated in United States Patent No. 2,535,960, dated December 26, 1950, and particularly represents an improvement in the modification of said harvester contemplated by United States Patent No. 2,710,513, dated June 14, 1955; such modification including, in cooperation with a rotary topping disc, a driven feed auger above the disc in a position to deflect or discharge topped beets from such disc at a peripheral point from which the beets fall onto an adjacent carry-off conveyor.

Such carry-off conveyor, which inclines upwardly from one end, is mounted so that the topped beets, as discharged from the rotary topping disc—by the driven feed auger—will fall by gravity onto the lower end portion of said conveyor.

Heretofore under certain working conditions, as when the topped beets are muddy, they had a tendency to unduly pile up or clog at said lower end portion of the conveyor, and onto which portion substantially all of the beets fell.

It is the major object of the present invention to provide a novel beet impelling or "kicking" device on the outer or discharge end of the driven feed auger which cooperates with the rotary topping disc; such device being operative to impart a forceful impact or kick to those beets which are discharged from the rotary topping disc by the auger, and such impact or kick being in a direction so that the beets are deflected or thrown to fall on the conveyor some distance—in the direction of travel—from said lower end portion. As a consequence the aforesaid piling up or clogging of the beets at the lower end portion of the conveyor is prevented.

Another important object of this invention is to provide a beet impelling device which, in addition to its function as above, is effective to loosen and free adhered soil from the beets as they are subjected to said impact; the beets and freed soil falling together onto the conveyor, there being separated by reason of the fact that the conveyor is of open type, which permits the soil to fall through the same.

Still another object of the invention is to provide a practical, reliable, and durable beet impelling device, and one which will be exceedingly effective for the purpose for which it is designed.

These objects are accomplished by means of such structure and relative arrangement of parts as will fully appear by a perusal of the following specification and claims.

In the drawings:

Fig. 1 is a fragmentary side elevation of a beet harvester, of the type described, embodying the present invention; the view being partly broken away and partly in section.

Fig. 3 is an enlarged fragmentary elevation of the outer end of the auger with the beet impelling device mounted thereon; the latter, together with the auger rod, being shown in section.

Figure 2:
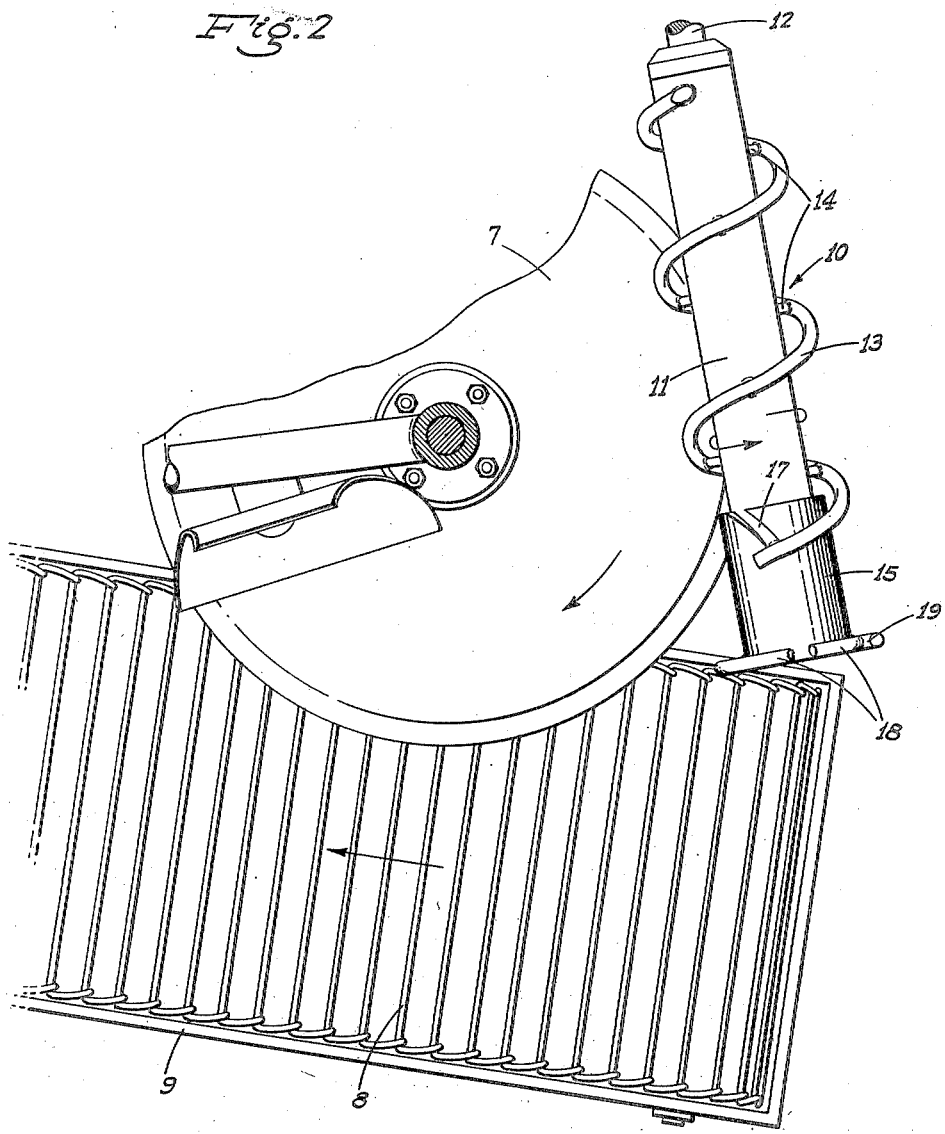
Fig. 2 is an enlarged fragmentary top plan view showing the assembly of the rotary topping disc, cooperating feed auger, and the conveyor therebelow; the beet impelling device being shown as mounted on the outer end of said auger.

Referring now more particularly to the drawings, and to the characters of reference marked thereon, the beet harvester, as more particularly shown and described in the above identified United States Patents No. 2,535,960, and No. 2,710,513, includes a longitudinal main frame 1, and thereabove a longitudinal secondary frame 2 which is mounted for limited vertical floating motion; the frame 1 projecting a distance ahead of the frame 2. The projecting portion of the main frame 1 supports a driven cross conveyor 3.

A spiked, beet pick-up wheel 4 is journaled on the secondary frame 2, and upon advance of the harvester is adapted to impale beets in the ground and to then carry said beets to the top of such wheel, and at which points the beets stand in an inverted position.

A supporting frame 5 upstands from the longitudinal secondary frame 2, and a power driven beet topping unit, indicated generally at 6, is mounted on the frame 5; such topping unit being operative to sever the beets from the tops or crowns, the latter then being stripped by means not here shown, and falling onto the cross conveyor 3 for delivery laterally from the harvester.

The power driven beet topping unit 6 includes a driven topping disc 7 which at one point in the periphery thereof overhangs the upper portion of the spiked, beet pick-up wheel 4 for the purpose of topping the inverted beets, as aforesaid, and at another point in its periphery such disc 7 overhangs a longitudinal beet receiving conveyor 8. Such longitudinal beet receiving conveyor 8—which is also mounted in connection with the frame 5—extends at an upward and rearward incline from its lower or forward end, and which end is disposed only slightly ahead of the driven topping disc 7. The conveyor 8 is disposed so that its upper run travels in an open bottom trough 9.

As the beets are topped by the disc 7, the topped beets move onto and travel with such disc; the direction of rotation of the latter being indicated by the arrows in Figs. 1 and 2.

A driven beet engaging and feed auger, indicated generally at 10, is mounted in connection with and actuated from the topping unit 6; such auger projecting from said unit and overlying the forward portion of the topping disc 7 at an acute angle to the conveyor 8. The outer end portion of the auger 10 projects a short distance from the disc 7 in the direction of the conveyor 8.

The auger 10 includes an elongated drum 11 journaled on a fixed supporting shaft 12; there being a spirally wound rod 13 surrounding the sleeve 8 in clearance relation but fixed in connection therewith by stand-off pins 14. The rod 13 is wound so that when the auger 10 turns in the direction indicated by the arrows in Figs. 1 and 2, such rod is operative to deflect engaged beets, which rest on said disc 7, and to discharge them from the peripheral portion of the disc which overlies the conveyor 8; all as heretofore contemplated.

However, previously the beets as discharged from the disc 7 by the auger 10 fell by gravity directly onto the lowermost portion of the conveyor 8, with the result that at certain times, as when the beets were muddy, they tended to pile up or clog on such portion of the conveyor. To prevent such occurrence the instant invention contemplates the attachment, on the outer end of the auger 10, of a novel, beet impelling device, which is constructed as follows:

A relatively short mounting sleeve 15 is engaged partlength on, and projects axially outwardly from, the free end of the elongated drum 11; such sleeve being retained in place by a set screw 16. Further the mounting sleeve 15, which engages the drum 11 in clearance relation within the adjacent convolution of the rod 13, is formed with a slot 17 cut on a spiral line, and which slot receives—in its closed end—the adjacent stand-off pin 14; the slot at its other end being open to permit of placement of the sleeve 15 on said elongated drum 11.

At the outer end thereof the mounting sleeve 15 is provided with a plurality of circumferentially spaced, beet engaging and impelling fingers 18 which are fixed to said sleeve, as by welding. The fingers 18 project substantially tangentially a distance from the sleeve 15 contra to the direction of rotation of the auger 10, and at their outer or free ends said fingers have inturned tips, as at 19.

When the harvester is in operation with topped beets being received on the disc 7, the auger 10 assures that said beets are fed to and delivered from the peripheral portion of the disc which overhangs the conveyor 8. The beets which are moved forward the full length of the auger 10 in engagement therewith, or adjacent thereto, are struck by the fingers 18 and as the auger turns at substantial speed such fingers impart a relatively forceful blow or kick to said beets in the direction of travel of the upper run of the conveyor 8. This causes such beets to be impelled or thrown in a rearward direction to fall onto the conveyor 8 a distance up the same; i. e., not at the immediate lower end portion. The result is that such beets cannot, as they are discharged from the disc 7, fall by gravity onto the immediate lower end portion of the conveyor 8, with the undesirable result hereinbefore described, but are received on the conveyor at a point sufficiently up the same so that they carry off without difficulty.

The described impelling device, by reason of the impact which it imparts to the beets, also produces a further advantageous result; to-wit, soil adhered to the beets is loosened and freed by such impact so that when the beets and freed soil fall onto the conveyor 8, the soil escapes therethrough. As a consequence the beets as they ultimately deliver from the harvester are cleaner than would otherwise be the case.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In a beet harvester, a conveyor, a driven beet topping and supporting disc mounted with a peripheral portion overhanging the conveyor, a driven feed auger above the disc in position to deflect supported beets to and for discharge from said peripheral portion, and means on the auger operative to strike beets discharging from said peripheral portion and to impart a throw to said struck beets generally lengthwise of the conveyor.

2. A structure, as in claim 1, in which said means includes a plurality of circumferentially spaced elements mounted in connection with and projecting from the feed auger.

3. A structure, as in claim 2, in which said elements are rigid fingers which extend outwardly from the auger generally contra to the direction of rotation thereof.

4. A structure, as in claim 3, in which the fingers have inturned tips thereon.

5. In a beet harvester, a conveyor, a driven beet topping and supporting disc mounted with a peripheral portion overhanging the conveyor, a driven feet auger above the disc in position to deflect supported beets to and for discharge from said peripheral portion, the auger having one end adjacent said peripheral portion, and a plurality of impact elements mounted in connection with said end of the auger operative to strike beets discharging from said peripheral portion and to impart a throw to said struck beets generally lengthwise of the conveyor.

6. A structure, as in claim 5, in which the auger is free at said one end and includes a drum, and a sleeve on the drum at said free end; the impact elements being fixed to the sleeve.

7. A structure, as in claim 6, in which the auger includes a spiral rod surrounding the drum in spaced relation, and stand-off pins securing said rod to the drum; the sleeve having a slot therein open to its inner end, and one of said pins being received in said slot.

8. In a beet harvester, a conveyor adapted to travel in one direction, a driven beet topping and supporting disc turnable about an upstanding axis, the disc being mounted with a peripheral portion overhanging the conveyor from laterally thereof, the disc turning in a direction so that one side thereof advances toward the conveyor and said peripheral portion moves generally in the direction of travel thereof, a driven feed auger above and projecting across said one side of the disc toward the conveyor and to a free end termination adjacent said peripheral portion of the disc, the auger turning in a direction to engage and deflect disc supported beets to said peripheral portion for discharge therefrom, and means on and rotatable with the free end of the auger operative to strike beets discharging from said peripheral portion of the disc and to impart a throw to said beets generally in the direction of travel of the conveyor.

9. A structure, as in claim 8, in which said means includes a plurality of impact fingers fixed in circumferentially spaced relation in connection with the auger; said fingers extending, in a radial plane, substantially tangentially from the auger and contra to the direction of rotation thereof.

10. A structure, as in claim 8, in which said means includes circumferentially spaced impact elements projecting outwardly from said free end of the auger in the plane of rotation; the auger turning at the bottom in the direction of travel of the conveyor.

No references cited.